US008675049B2

(12) United States Patent
Kopf et al.

(10) Patent No.: US 8,675,049 B2
(45) Date of Patent: Mar. 18, 2014

(54) NAVIGATION MODEL TO RENDER CENTERED OBJECTS USING IMAGES

(75) Inventors: Johannes Kopf, Bellevue, WA (US);
Eric Stollnitz, Kirkland, WA (US);
Sudipta Sinha, Redmond, WA (US);
Rick Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 339 days.

(21) Appl. No.: 13/156,975

(22) Filed: Jun. 9, 2011

(65) Prior Publication Data

US 2012/0314040 A1 Dec. 13, 2012

(51) Int. Cl.
*H04N 13/02* (2006.01)

(52) U.S. Cl.
USPC .............. 348/50; 348/42; 348/46; 348/208.4; 345/419

(58) Field of Classification Search
USPC .............. 348/50, 42, 46, 208.4; 345/419
See application file for complete search history.

(56) References Cited

U.S. PATENT DOCUMENTS

| | | | |
|---|---|---|---|
| 6,526,166 B1 * | 2/2003 | Gorman ..................... | 382/154 |
| 2001/0053284 A1 * | 12/2001 | Shin ......................... | 396/5 |
| 2006/0132482 A1 | 6/2006 | Oh | |
| 2007/0211149 A1 * | 9/2007 | Burtnyk et al. ............ | 348/208.4 |
| 2007/0236561 A1 * | 10/2007 | Anai et al. ................ | 348/46 |
| 2009/0259976 A1 | 10/2009 | Varadhan et al. | |
| 2010/0045703 A1 * | 2/2010 | Kornmann et al. ........ | 345/653 |
| 2011/0244919 A1 * | 10/2011 | Aller et al. ............... | 455/556.1 |

OTHER PUBLICATIONS

Santos et al., "Camera control based on rigid body dynamics for virtual environments", May 2009, IEEE, International Conference on Virtual Environments, 6 pages.*

Nieuwenhuisen, et al., "Motion planning for camera movements", Retrieved at <<http://ieeexplore.ieee.org/stamp/stamp.jsp?tp=&arnumber=1308871>>, Proceedings of IEEE International Conference on Robotics & Automation, Apr. 26-May 1, 2004, pp. 3870-3876.

Smith, et al., "Light field video stabilization", Retrieved at <<http://ieeexplore.ieee.org/stamp/stamp.jsp?tp=&arnumber=5459270>>, Proceedings of 12th IEEE International Conference on Computer Vision, Sep. 29-Oct. 2, 2009, pp. 341-348.

Marchand, et al., "Image-based virtual camera motion strategies", Retrieved at <<http://www.irisa.fr/lagadic/pdf/2000_gi_marchand.pdf>>, Proceedings of Graphics Interface Conference, May, 2000, pp. 8.

(Continued)

*Primary Examiner* — Christopher S Kelley
*Assistant Examiner* — Matthew Kwan
(74) *Attorney, Agent, or Firm* — Steve Wight; Peter Taylor; Micky Minhas

(57) ABSTRACT

A 3D model of an object is rendered using centered images of the object. An algorithm executed locally or in a distributed manner calculates camera positions for the images and determines a virtual camera path based on the camera positions. The application adjusts the images to fit the plane of the virtual camera path and fills in the gaps between the images using transition renderings. To improve user experience, the application also calculates resting positions for navigation stop points using a spring system. Upon constructing the 3D model, the application can transmit the 3D model to a variety of user devices including the network connected device having a camera module that captured the images.

19 Claims, 7 Drawing Sheets

(56) References Cited

OTHER PUBLICATIONS

Goemans, et al., "Automatic Generation of Camera Motion to Track a Moving Guide", Retrieved at <<http://citeseerx.ist.psu.edu/viewdoc/download?doi=10.1.1.2.1792&rep=rep1&type=pdf>>, Proceedings of International Workshop on the Algorithmic Foundations of Robotics, Jul. 20, 2004, pp. 1-17.

Santos, et al., "Camera control based on rigid body dynamics for virtual environments", Retrieved at <<http://ieeexplore.ieee.org/stamp/stamp.jsp?tp=&arnumber=5068922>>, International Conference on Virtual Environments, Human-Computer Interfaces and Measurements Systems, May 11-13, 2009, pp. 6.

* cited by examiner

NAVIGATION MODEL TO RENDER CENTERED OBJECTS USING IMAGES

BACKGROUND

Animation usually refers to rapid flow of images faster than human eyes refresh rate giving the illusion of fluid motion. Animation techniques have been around for centuries. One of the most prevalent animation techniques is cinematography. In cinematography, film frames are passed through a light source at a rapid rate and reflected onto a screen. Advances in cinematography have enabled films to be shot by two cameras to record depth. Similarly, an object can be represented in three-dimensional (3D) using multiple images of the object.

Capturing and rendering objects in detail using photography is a difficult and sometimes elusive end goal. Enhanced camera technologies have enabled taking multiple images of an object to render a 3D representation. However, processing images of an object to provide a 3D representation is a cumbersome process. Present technologies use turntables so that depth information does not need to be computed when spinning. Such techniques display the images in a flip-book style. Because of the use of a turn table the camera path is stabilized. Alternatively, elaborate mechanisms may be needed to move the camera along a predefined path while capturing images of the object. Such requirements are not ideal and cannot capture an object in real life situations using images to render a 3D model.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to employing a navigation model to render a centered object using images. A computing application such as a locally installed or distributed application may receive images of an object captured by a camera. The application may determine camera positions for the images to infer a virtual camera path based on the camera positions. Additionally, the application may determine resting positions for navigation stop points during the rendering of the centered object. And, the application may construct and transmit a three-dimensional (3D) model of the object navigable around the virtual camera path.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
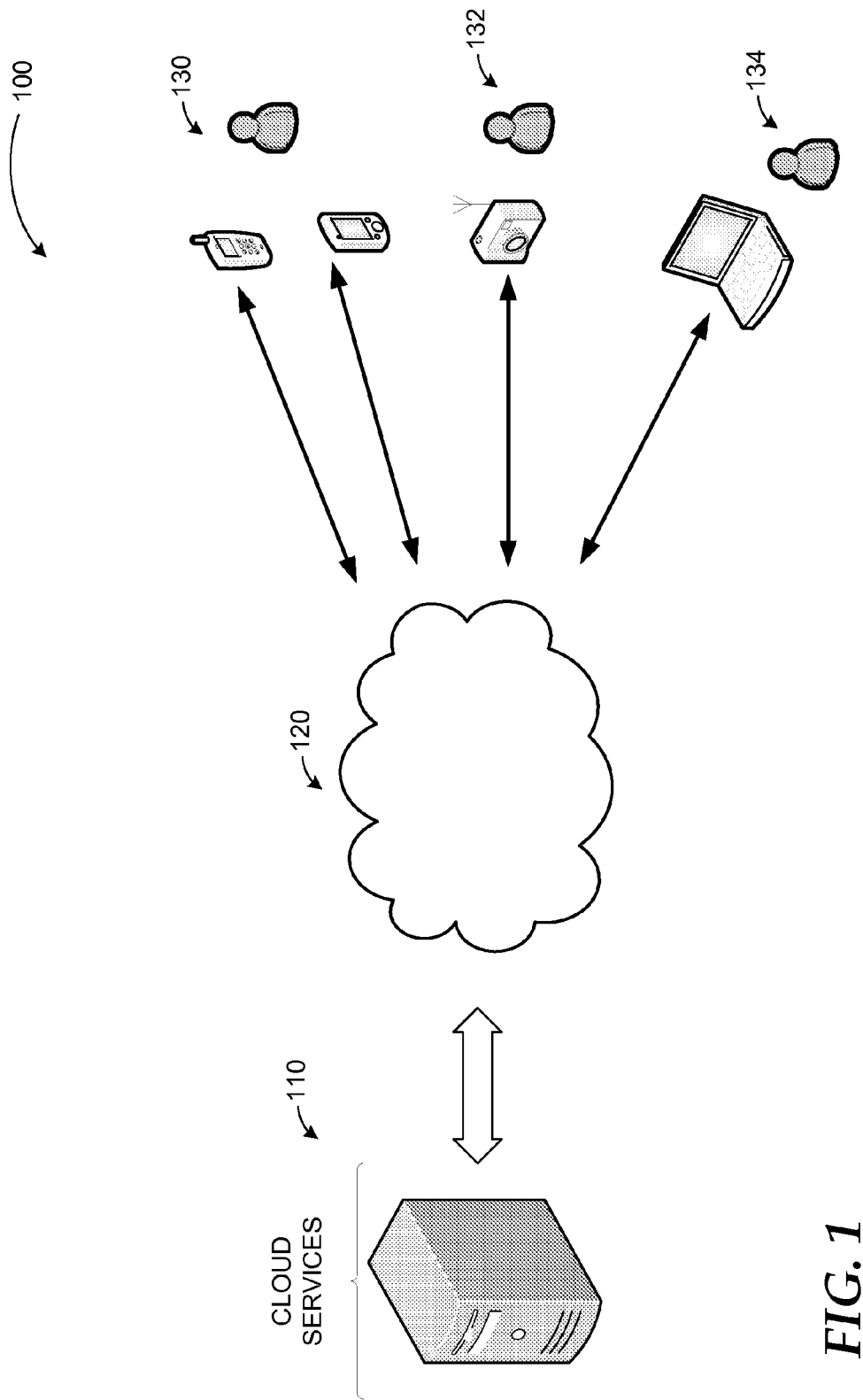
FIG. 1 is a diagram illustrating example components of a system employing a navigation model to render a centered object using images in an application.

As briefly described above, a navigation model may be used in a computing application to render a centered object using images. The computing application may receive images of an object captured by a camera. The application may determine camera positions for the images to infer a virtual camera path based on the camera positions. Additionally, the application may determine resting positions for navigation stop points during the rendering of the centered object. And, the application may construct and transmit a 3D model of the object navigable around the virtual camera path.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer readable memory device. The computer-readable storage medium can for example be implemented via one or more of a volatile computer memory, a non-volatile memory, a hard drive, a flash drive, a floppy disk, or a compact disk, and comparable physical storage media.

Throughout this specification, the term "platform" may be a combination of software and hardware components for processing images. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A distributed computing application is an application with multiple components executable over systems spanning multiple computers connected over a network. Cloud computing is a form of distributed computing enabling users to enjoy computing resources of distributed systems with seamless access through the internet. An application running in a cloud computing resource may provide an application to meet complex computing demands. A cloud application may enable a navigable 3D rendering of an object using its images. The cloud application may be able to process the object's images to create a circular view of the object that is navigable.

Embodiments are not limited to a cloud application as described above. Locally installed applications, on-premise applications, and other configurations may be employed using the principles described herein. The rendered 3D model may be navigable right to left or left to right. Alternatively, the navigation direction may depend on the orientation of the captured images around the object. The rendered object may be navigable along of a circular arc or a virtual camera path through which the images were captured. In an example scenario, if a user captured multiple pictures of an object from one side of the floor, from the top, and from the other side of the floor, the 3D model may be navigable from floor to top and top to floor.

Embodiments enable a navigation model to render a centered object using images. Cloud computing (also referred to as the cloud) may enable computing resource-restricted devices to have access to rendering resources in order to create 3D models of objects using images. Shifting the computing burden to the cloud may minimize resource utilization such as processing, memory, data storage, and network. A client device may gain enhanced functionality through the utilization of the cloud resources. While references are made to a bi-directionally navigable 3D model rendering using a virtual camera path throughout the Specification and Claims, embodiments are not limited to only bi-directional navigation. A 3D model of an object may be navigated from any direction applying the principles discussed herein.

Figure 2:
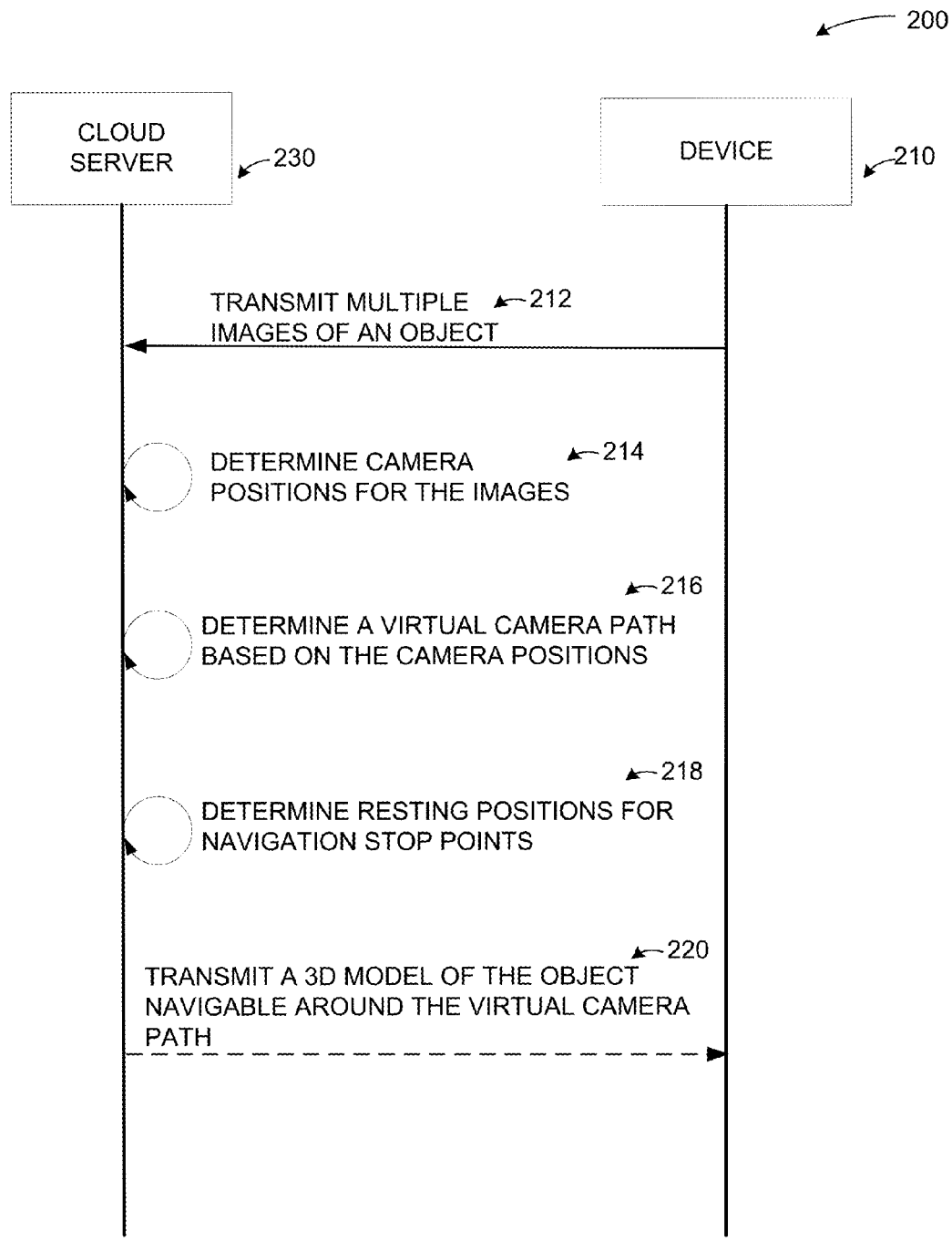
FIG. 2 illustrates an example action diagram of employing a navigation model to render a centered object using images.

FIG. 1 is a diagram illustrating example components of a system employing a navigation model to render a centered object using images in a cloud application. As mentioned above, embodiments may also be implemented in locally installed or other types of applications. The example environments in FIG. 1 and FIG. 2 are for illustration purposes only. In diagram 100, the server 110 may provide cloud services such as a rendering platform to generate 3D models from images. In an example scenario, a network-connectable camera may upload images to a cloud application. The images may be captured in an ark like trajectory. The cloud application may process the images and determine a virtual camera path. The cloud application may then render the 3D model using the virtual camera path. The resulting 3D model may have user interactive features such as the ability to navigate the model along the virtual camera path.

Embodiments enable navigable 3D model for an object using captured images of the object produced through computing resources using a network 120. The network 120 may be a local network or may be an external entity such as an Internet based infrastructure. It may provide wired or wireless connectivity. Clients 130, 132, 134, and the service may connect to each other through unsecured or secured connectivity. An example of a secured connectivity may be a Virtual Private Network (VPN) established among the clients and the rendering service with the use of encrypted communications.

The server 110 may reconstruct 3D models of an object from images provided by a network-connectable camera or a device bridging a camera. A user may capture multiple images of an object in a circular path around the object. The camera may face the object and focus on it. The cloud application may receive the images from the network-connectable camera (e.g.: a smart phone with a camera module) or alternative devices bridging the camera to a network connection. Connectivity devices may include portable computers, desktop computers, standalone networkable devices, etc. Number of images may determine the quality and resolution of the reconstructed 3D model. Higher number of images may provide a higher quality and higher resolution 3D model. In an example, an image within 10 degree or smaller angular increments may provide a 3D model with optimum resolution. The circular path may be incomplete. Additionally, the cloud application may produce a partial or 360 degree navigable 3D model depending on the completion of the circular path during image capture.

In an alternative embodiment, the cloud application executed on the server 110 may determine resting positions for navigation stop points. A client application displaying the 3D model may stop navigation at points corresponding to images of the object. Resting positions may improve visual quality of the displayed 3D model by projecting the corresponding image instead of a transition animation between the resting points. The best "resting positions" are at the places in space that correspond to the optical centers of the input cameras.

Alternatively, the cloud application may be executed in peer devices that are able to reconstruct the 3D model. In an example, a peer-to-peer application may distribute processing requirements among multiple devices thereby utilizing additional processing resources in the device ecosystem. Embodiments are not limited to client/server and peer-to-peer architectures. Employing a navigation model to reconstruct a centered object using images in a cloud application may be accomplished using other architectures.

FIG. 2 illustrates an example action diagram of employing a navigation model to reconstruct a centered object using images. A device 210 may utilize computing resources of a cloud server 230 to have a 3D model of an object rendered using the object's images. The camera may face and focus on the object while capturing images in a circular or similar arc around the object. The cloud application may be able to accommodate variations from a circular path by determining a virtual camera path. The cloud application may compute a trajectory for the virtual camera path by estimating the location of the object. The cloud application may further estimate the object's location by calculating a closest point on the object from the camera's optical axes. In an example scenario, a camera's optical axes may be the camera's front vectors such as the three dimensional direction of the camera's lens.

Device 210 may initiate rendering of a 3D model of the object at operation 212 by transmitting multiple images of an object 212 to an application running on the cloud server 230. The images may be captured and uploaded by a device with camera functions (e.g.: a smart phone), a camera with communication capability, a portable computer with a camera, and comparable ones. Alternatively, a user may choose to upload the images using a network connected device by linking a camera to a network connected device and uploading the image through the network connected device.

Subsequent to receiving the images, the cloud application may determine camera positions for the images 214. The camera positions may have orthonormal up vectors, right vectors, and front vectors (optical axis). The images may be captured in a circular or similar path around the object while the camera is pointed towards the object. The cloud application may estimate a distance to the object using an optical axis of the camera. The optical axis may correspond to the front vectors of the camera lens in some embodiments. Subsequently, the cloud application may determine a virtual camera path based on the camera positions 216. The cloud application may approximate a circular virtual camera path travelling in between the estimated camera positions.

Next, the cloud application may determine resting positions for navigation stop points 218. In an embodiment, the cloud application may designate camera positions associated with the virtual camera path as the resting positions. Using images as resting points may provide a better user experience when a device displays the image of the object when a user stops navigating the 3D model. The image of the device may be higher quality and resolution than a transition rendering in between images along the virtual navigation path.

The cloud application may construct and transmit the 3D model of the object navigable around the virtual camera path to other devices. Optionally, device 210 may receive the 3D model as well (220). According to some embodiments, users may be enabled to navigate the 3D model right-to-left and left-to-right in a circular arc around the object. Alternatively, the navigation direction may be determined based on the virtual path of the camera. In an example, if the images of an object are captured from top to bottom, the virtual path of the camera may be top-to-bottom and bottom-to-top. In an alternative embodiment, the cloud application may create a virtual mirror of the available images and create a 3D model including the captured images and a mirror of the images. An example may be 3D model of an object using pictures from 90 degree arc around the object mirrored to a navigable 3D model of a 180 degree arc.

The described navigation model to render a centered object using images is for illustration purposes. Other navigation model schemes may be used to render 3D models of objects. Furthermore, images may be captured by a variety of devices including digital cameras, analog cameras, devices with camera modules (e.g.: smart phones), etc. In an example scenario, a smart phone may capture images of a car around a 90 degree circular arc and upload the images to a cloud application using the smart phones wireless connectivity. The cloud application may render a 3D model of the car using the images and transmit back to the smart phone to have the model displayed.

Figure 3:
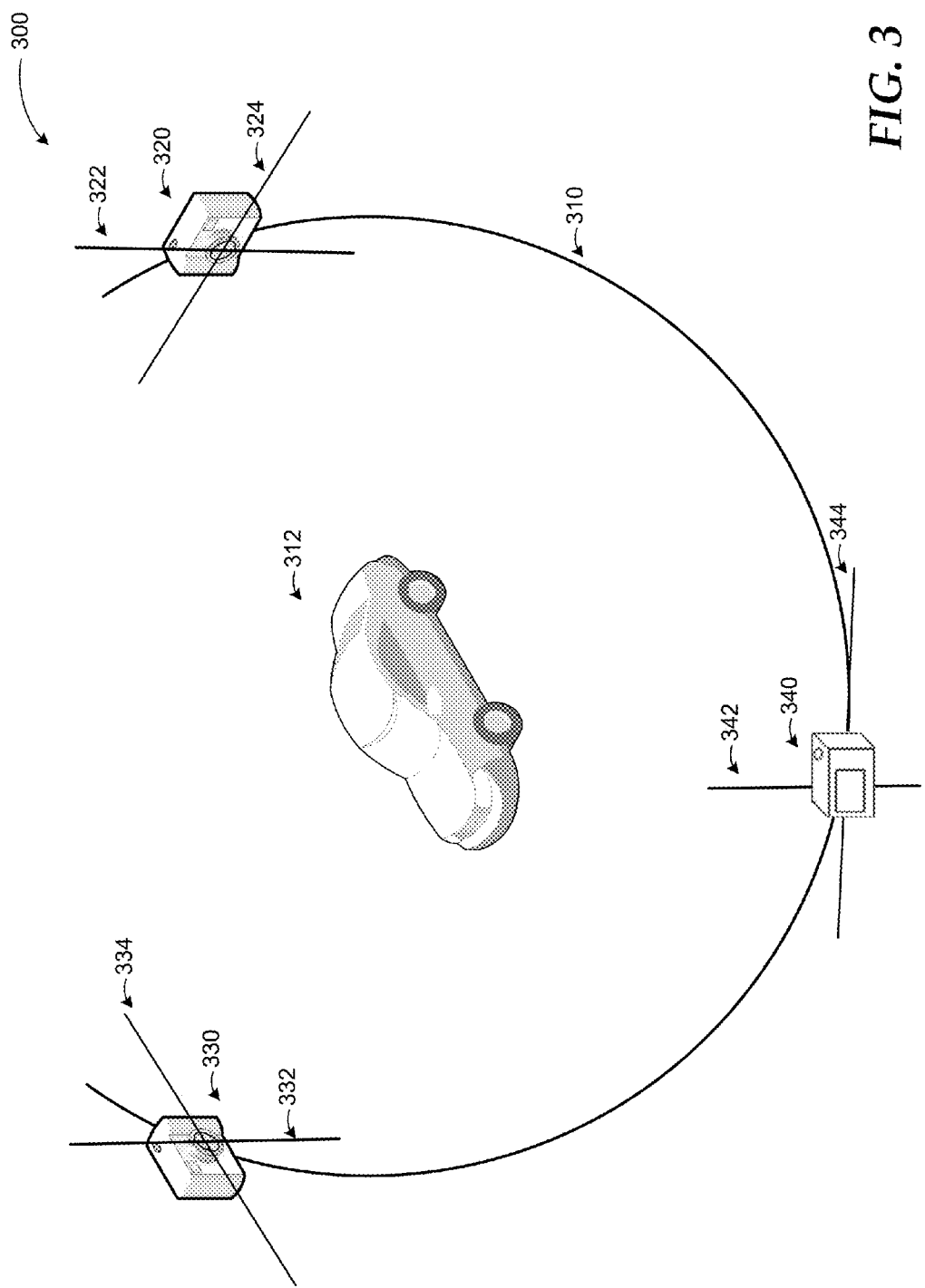
FIG. 3 illustrates example capture of images employing a navigation model to render a centered object.

FIG. 3 illustrates example capture of images employing a navigation model to render a centered object. Diagram 300 displays an example virtual camera path. The virtual camera path 310 may be inferred from images captured around the object 312. Additionally, the virtual camera path may have resting points corresponding to camera positions of the image. The resting points may enable a 3D model displaying device to project images of the object upon user navigation stop. Therefore, the 3D model may provide a higher quality user experience during navigation.

An application may determine the virtual path 310 from images captured around the object 312 and estimate the camera position at location 320 and determine optical axes 322 and 324 to draw a plane for the virtual camera path according to the optical axes 322 and 324. Additionally, the application may estimate the camera position at a second location 340 and determine optical axes 342 and 344 and adjust the plane for the virtual camera path according to the optical axes 342 and 344. Furthermore, the application may estimate the position of the camera at a third location 330, determine optical axes 332 and 334, and adjust the plane for the virtual camera path according to the optical axes 332 and 334. Next, the application may fit the virtual camera path normal to the calculated planes. And, the application may render the 3D model of the object 312 by using the images at locations 320, 330, 340 and filling the locations in between with transition renderings.

The application may estimate the location of the object by using an algorithm to determine a point of the object near (e.g.: closest) to the optical axes in a least squares sense. In one embodiment, $p_i$ may be a camera position and i and $f_i$ may be vectors for optical axes or front vectors (e.g. directions of the camera lens). Next, the point x may be calculated using $$\langle x - (p_i + t \cdot f_i), f_i \rangle = 0. \quad [1]$$

Accordingly, the optical axis may be defined by $p_i + t \cdot f_i$. The application may further calculate for t using $$t = \frac{\langle x, p_i \rangle - \langle p_i, f_i \rangle}{\langle f_i, f_i \rangle}. \quad [2]$$

Afterwards, the application may determine the point x closest to several optical axes by calculating for an energy term:

$$E = \sum_i \left\| x - \left( p_i + f_i \cdot \left( \frac{\langle x, p_i \rangle - \langle p_i, f_i \rangle}{\langle f_i, f_i \rangle} \right) \right) \right\|^2. \quad [3]$$

According to another embodiment, x may be calculated using a linear system of equations directly following the energy term. In the expressions above, <..,..> denotes a dot product of two vectors.

In a next step, the application may continue processing the algorithm by fitting the planes to the camera positions in the least squares sense and embed the virtual camera path into the planes. The application may project the object and the camera positions into the planes. In an embodiment, the application may choose arbitrary orthonormal vectors in the planes to define a 2D Euclidean coordinate system with a projected object location as origin.

In another embodiment, the virtual camera path may be determined as a closed loop around the origin. Thus, the application may determine the virtual camera path in a polar coordinate system. Additionally, the images may be captured in angles at regular increments. An exemplary embodiment may be about every 10 degree angular increment.

In an alternative embodiment, the application may initialize every image by setting the object distance for every camera position to the distance of the camera that is closest to the object. Next, the application may smooth the distances by convolving with a wide Gaussian kernel, e.g. σ=40 degrees. Subsequently, the application may convert the camera positions back to 3D Euclidean coordinates to obtain the virtual camera path polyline.

In yet another alternative embodiment, the application may use global positioning satellite (GPS) provided or similarly obtained coordinates to determine the optical axes of the camera. For example, the algorithm may receive and utilize coordinates for the optical axes of the camera determined through wireless signal triangulation.

Another step in the algorithm may be to crop the virtual camera path in case the camera covers only a partial arc around the object. The application may detect the largest angular gap between any two camera positions in the path plane. If the gap is larger than a predefined threshold (e.g.: 25 degrees), the application may remove the part of the arc that corresponds to the gap from the camera path.

The scenarios discussed above are provided as example embodiments. Other scenarios may be used to employ a navigation model to render a centered object using images utilizing the principles discussed herein.

Figure 4:
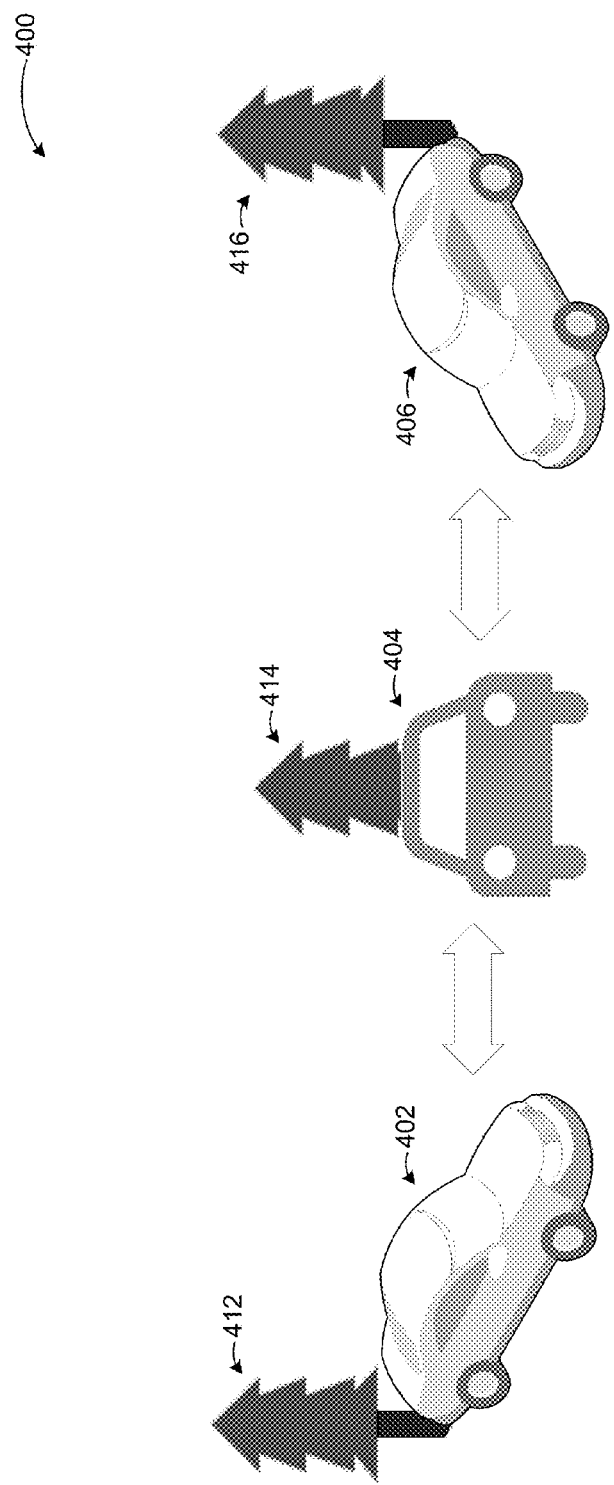
FIG. 4 displays an example utilization of a navigation model to render a centered object using images.

FIG. 4 displays an example utilization of a navigation model to render a centered object using images. An example virtual camera path may have resting positions to provide a high quality rendering of an object at navigation stop points. In an embodiment, the resting positions may correspond to image locations.

Diagram 400 illustrates exemplary stopping points for resting positions of the 3D model. A user may navigate the 3D model to start with object 402 in a resting position displaying the object's left profile and background 412 towards the left of the object while facing the object. When the user navigates to the left, the 3D model may turn to a center resting point in which the object 404 may be centered and may have its background 414 displayed accordingly. When the user continues to navigate to the left, the 3D model is further turned by the displaying device to stop at resting position displaying the right profile of the object's 406 while facing the object. The object's background 416 may be displayed to the right of the object.

In another embodiment, an application may determine the resting positions to provide an improved user navigation experience. The application may process an algorithm to determine the resting positions. The algorithm may snap viewpoints using the resting positions by parameterizing the camera positions by an angle $\phi_c$. The algorithm may use distance $d_c$ to offset a distance of the camera to the virtual camera path and height $h_c$ to offset a height along a direction normal to the virtual camera path.

Next, the algorithm may implement a spring system to smooth a motion of the camera by attaching resting values $\phi_r$, $d_r$, $h_r$ corresponding to one of the camera positions to the current values of a current camera position $\phi_c$, $d_c$, $h_c$. The spring system may bring the current values to the resting values using $\phi_c \leftarrow \phi_r + (\phi_c - \phi_r) e^{(\Delta t \cdot k)}$. Additionally, the algorithm may define $\Delta t$ as a time since last update and k as a spring constant controlling a stiffness property of the spring system.

The systems and implementations of employing a navigation model to render a centered object using images discussed above are for illustration purposes and do not constitute a limitation on embodiments. Virtual camera paths and resting positions may be calculated by algorithms within an application. A navigation model to render a centered object using images may be implemented employing other modules, processes, and configurations using the principles discussed herein.

Figure 5:
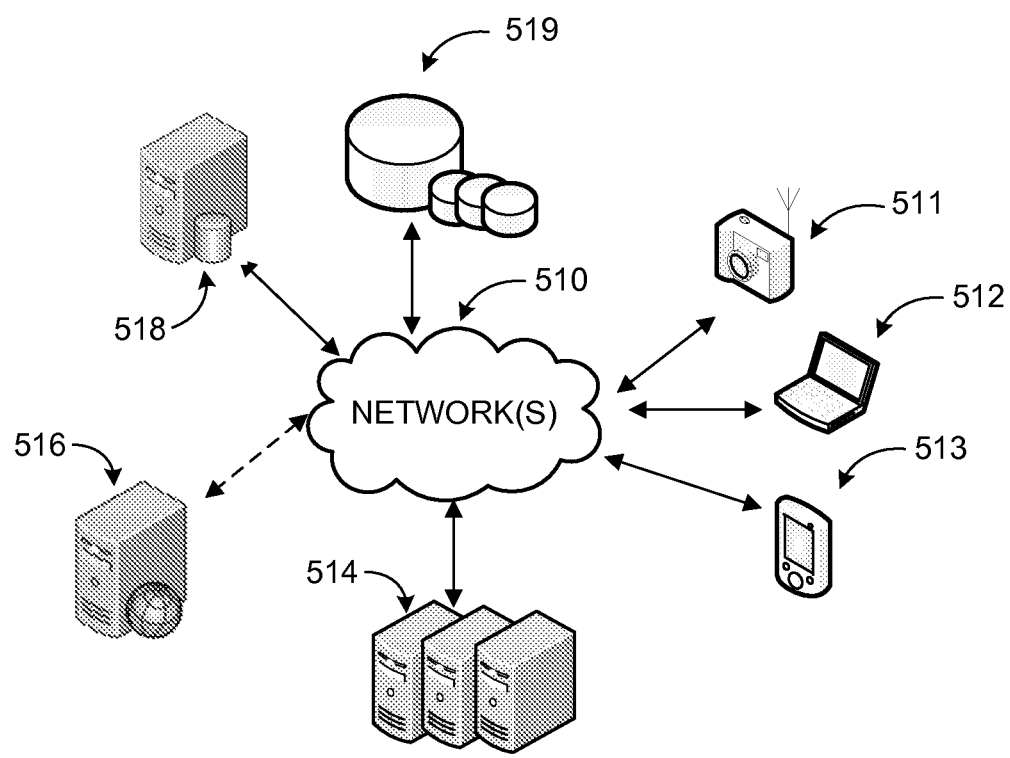
FIG. 5 is a networked environment, where a system according to embodiments may be implemented.

FIG. 5 is an example networked environment, where embodiments may be implemented. Virtual camera path determination may be provided via software executed over one or more servers 514 or a single server (e.g. web server) 516 such as a hosted service. The platform may communicate with individual computing devices such as a smart phone 513, a laptop computer 512, or a network-connectable camera 511 through network(s) 510.

As discussed above, a cloud application may render a 3D model of an object using centered images. The captured images may be transmitted from devices 511-513. After receiving the images, the cloud application may determine a virtual camera path to render the 3D model around. The cloud application may also determine resting positions corresponding to camera positions of the images to provide a higher quality navigation experience to the user.

Devices 511-513 may enable access to cloud applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed for a navigation model to render a centered object using images. Furthermore, the networked environments discussed in FIG. 5 are for illustration purposes only. Embodiments are not limited to the example applications, modules, or processes.

Figure 6:
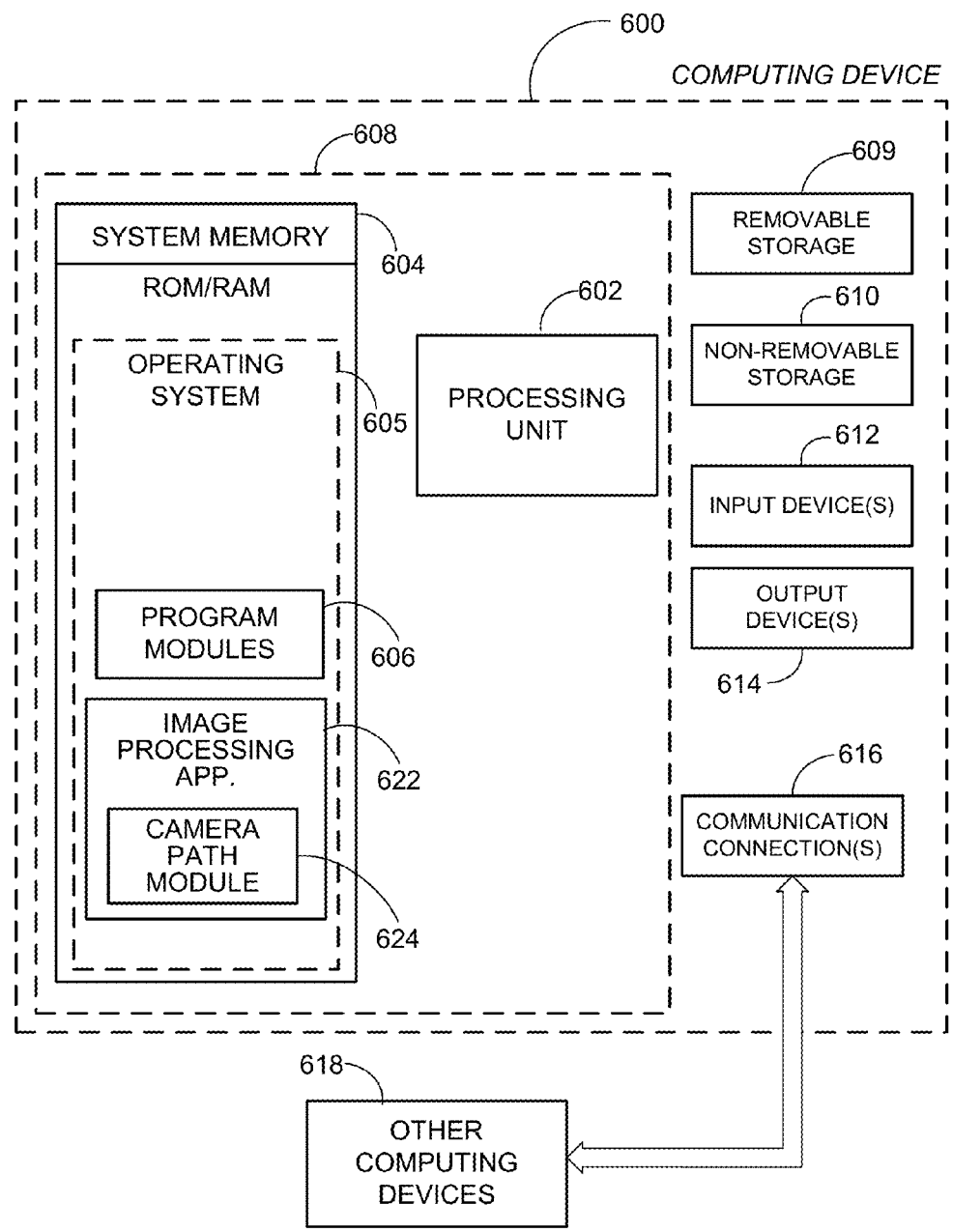
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, image processing application 622, and virtual camera path module 624.

Image processing application 622 may be part of a service for rendering a navigable 3D model using images of an object. Virtual camera path module 624 may enable a higher quality user experience during navigation of the 3D model by determining a virtual camera path from captured images and associating resting points with the images. An application may execute the algorithm to align the images into a plane of the virtual camera path and fill in the gaps between images with rendered transitions. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
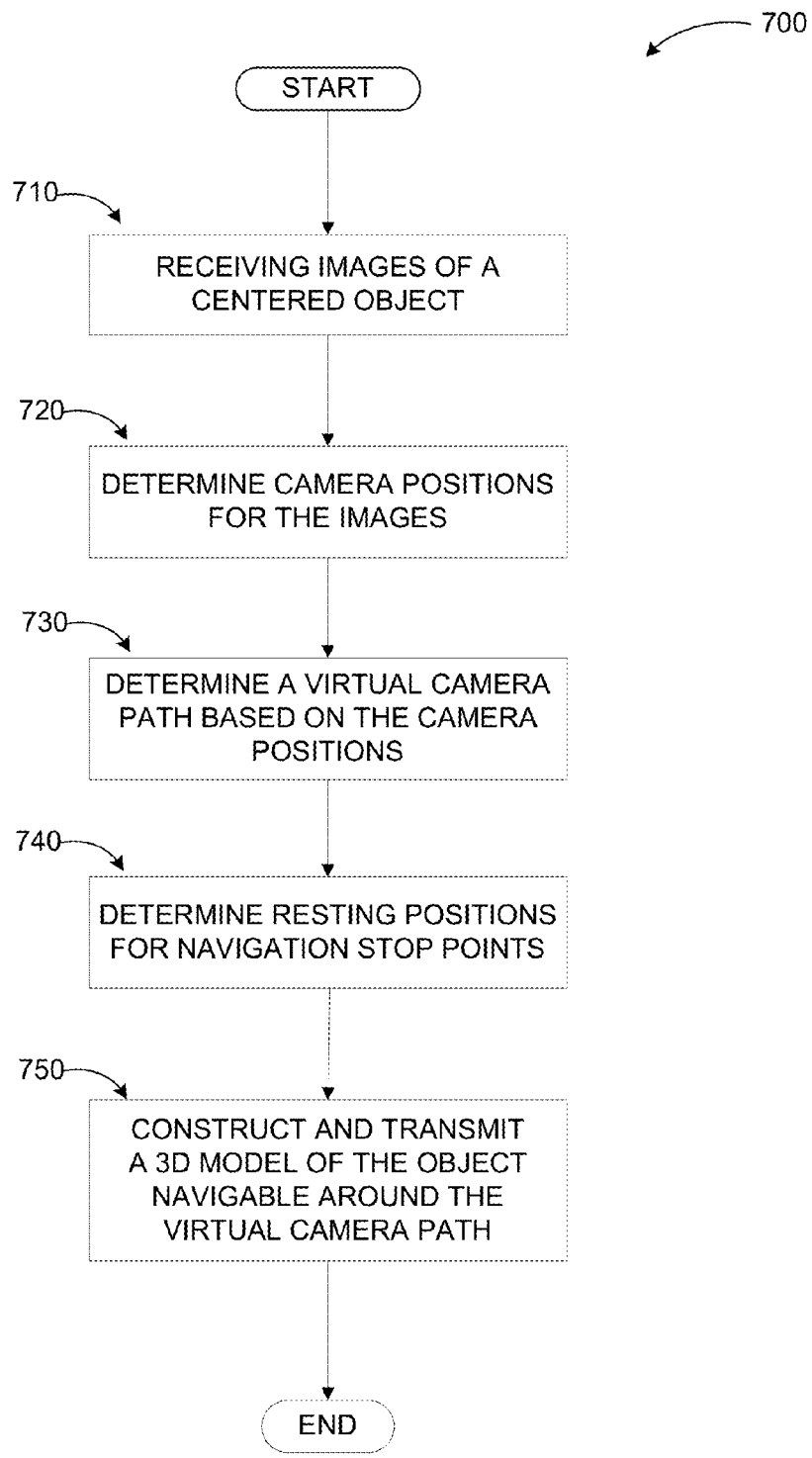
FIG. 7 illustrates a logic flow diagram for a process employing a navigation model to render a centered object using images according to embodiments.

FIG. 7 illustrates a logic flow diagram for a process employing a navigation model to render a centered object using images according to embodiments. Process 700 may be implemented by a distributed or locally installed application.

Process 700 may begin by receiving images of a centered object from a camera or a device connecting a camera to a network at operation 710. An application running in a computing resource may determine camera positions for the images using a predefined algorithm at operation 720. The application may continue to execute the algorithm to determine a virtual camera path based on the camera positions and align the images to the plane of the path at operation 730. To improve user navigation experience, the application may determine resting positions for navigation stop points to enable a spring system to stop the 3D model navigation along camera positions corresponding to the images. Next, the application may construct and transmit the 3D model of the object navigable around the virtual camera path (e.g.: left to right and right to left navigation).

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. A navigation model to render a centered object using images according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for employing a navigation model to reconstruct an object using images, the method comprising:
receiving images of an object captured by a camera;
determining camera positions for the images;
determining a virtual camera path based on the camera positions;
associating the camera positions with vectors of one or more directions;
estimating a location of the object to be a point x near optical axes of multiple cameras using a least squares computation;
defining the point x near the optical axes using $<x-(p_i+t\cdot f_i), f_i> = 0$, in which $p_i$ is one of the camera positions and $f_i$ is a camera's forward-facing direction;
defining a point closest to x on a ray defined by the optical axes by $p_i+t\cdot f_i$; and
determining t by $$t = \frac{\langle x, p_i \rangle - \langle p_i, f_i \rangle}{\langle f_i, f_i \rangle},$$

determining resting positions for navigation stop points; and
constructing and transmitting a three-dimensional (3D) model of the object navigable following the virtual camera path.

2. The method of claim 1, wherein the virtual camera path has a trajectory approximating an arc around the object.

3. The method of claim 1, wherein the virtual camera path is navigable left-to-right, and right-to-left.

4. The method of claim 1, wherein the images are captured in a circular shape around the object while the camera is pointed towards the object.

5. The method of claim 1, further comprising:
associating the camera positions with orthonormal up vectors, right vectors, and front vectors.

6. The method of claim 1, further comprising:
determining a point closest to several optical axes by minimizing an energy term:

$$E = \sum_i \left\| x - \left( p_i + f_i \cdot \left( \frac{\langle x, p_i \rangle - \langle p_i, f_i \rangle}{\langle f_i, f_i \rangle} \right) \right) \right\|^2.$$

7. The method of claim 1, further comprising:
computing x by solving a linear system of equations derived in a least squares sense.

8. The method of claim 1, further comprising:
smoothing a motion of the camera by attaching resting values corresponding to the camera positions to current values of a current camera position.

9. The method of claim 1, in which,
fitting a plane to the camera positions using a least squares computation; and
embedding the virtual camera path into the plane.

10. A computing device capable of employing a navigation model to reconstruct an object using images, the computing device comprising:
a memory;
a processor coupled to the memory, the processor executing an application in conjunction with instructions stored in the memory, wherein the application is configured to:
receive the images of the object captured by a camera;
determine camera positions for the images by:
fitting a plane to the camera positions; and
determining a virtual camera path based on the camera positions by embedding the virtual camera path into the plane;
associate the camera positions with vectors of one or more directions;
estimate a location of the object to be a point x near optical axes of multiple cameras using a least squares computation;
define the point x near the optical axes using $\langle x-(p_i+t \cdot f_i), f_i \rangle = 0$, in which $p_i$ is one of the camera positions and $f_i$ is a camera's forward-facing direction;
define a point closest to x on a ray defined by the optical axes by $p_i + t \cdot f_i$; and
determine t by $$t = \frac{\langle x, p_i \rangle - \langle p_i, f_i \rangle}{\langle f_i, f_i \rangle}.$$

determine resting positions for navigation stop points; and
construct and transmit a three-dimensional (3D) model of the object navigable following the virtual camera path.

11. The computing device of claim 10, wherein the application is further configured to:
choosing arbitrary orthonormal vectors in the plane to define a two-dimensional (2D) Euclidean coordinate system with a projected location of the object as an origin.

12. The computing device of claim 10, wherein the application is further configured to:
snap viewpoints using the resting positions by:
parameterizing at least one of the camera positions by an angle $\phi_c$; and
using a predefined distance $d_c$ to offset a distance of the camera to the virtual camera path and a predefined height $h_c$ to offset a height of the camera along a direction normal to the virtual camera path.

13. The computing device of claim 12, wherein the application is further configured to:
employ a spring system to smooth a motion of the camera by attaching resting values $\phi_r$, $d_r$, $h_r$ corresponding to the camera positions to current values of a current camera position $\phi_c$, $d_c$, $h_c$.

14. The computing device of claim 13, wherein the spring system brings the current values to the resting values using $\phi_c \leftarrow \phi_r + (\phi_c - \phi_r)e^{(\Delta t \cdot K)}$.

15. The computing device of claim 14, wherein $\Delta t$ is a time since a last update and k is a spring constant controlling a stiffness property of the spring system.

16. The computing device of claim 10, wherein the computing device is a camera-equipped smart phone.

17. A computer-readable memory device with instructions stored thereon for employing a navigation model to reconstruct an object using images, the instructions comprising:
receiving the images of the object captured by a camera;
determining camera positions for the images by:
fitting a plane to the camera positions using a least squares computation; and
determining a virtual camera path based on the camera positions by embedding the virtual camera path into the plane;
associating the camera positions with vectors of one or more directions;
estimating a location of the object to be a point x near optical axes of multiple cameras using a least squares computation;
defining the point x near the optical axes using $\langle x-(p_i+t \cdot f_i), f_i \rangle = 0$, in which $p_i$ is one of the camera positions and $f_i$ is a camera's forward-facing direction;
defining a point closest to x on a ray defined by the optical axes by $p_i + t \cdot f_i$; and
determining t by $$t = \frac{\langle x, p_i \rangle - \langle p_i, f_i \rangle}{\langle f_i, f_i \rangle}.$$

determining resting positions for navigation stop points using a spring system; and
constructing and transmitting a three-dimensional (3D) model of the object navigable around the virtual camera path.

18. The computer-readable memory device of claim 17, wherein the camera positions are further determined through one of Global Positioning Satellite (GPS) coordinates and wireless signal triangulation.

19. The computer-readable memory device of claim 17, wherein the images are captured in about 10 degree angular increments around the object.

* * * * *